United States Patent

[11] 3,629,498

[72] Inventor Sing Liong Tan
Emmasingel, Eindhoven, Netherlands
[21] Appl. No. 2,460
[22] Filed Jan. 13, 1970
[45] Patented Dec. 21, 1971
[73] Assignee Philips Corporation
New York, N.Y.
[32] Priority Jan. 14, 1969
[33] Netherlands
[31] 6900556

[54] CIRCUIT ARRANGEMENT FOR VERTICAL APERTURE CORRECTION
4 Claims, 3 Drawing Figs.

[52] U.S. Cl. ........ 178/7.2, 178/DIG. 25
[51] Int. Cl. ........ H04n 5/14
[50] Field of Search ........ 178/7.1 AC, 7.1 R, 7.2

[56] References Cited
UNITED STATES PATENTS

| | | | |
|---|---|---|---|
| 2,757,236 | 7/1956 | Bedford | 178/7.1 AC |
| 2,864,887 | 12/1958 | Weimer | 178/7.1 AC |
| 2,971,053 | 2/1961 | Gibson | 178/7.1 AC |
| 3,444,318 | 5/1969 | Monteath | 178/7.1 AC |

*Primary Examiner*—Benedict V. Safourek
*Assistant Examiner*—Richard P. Lange
*Attorney*—Frank R. Trifari

ABSTRACT: A circuit arrangement for vertical aperture correction of a picture signal which is line and field-generated by means of a television camera. The line interlaced generated picture signal is applied to a first correction circuit wherein at least one delaying element gives the picture signal a first and a second time delay of one line period, and wherein by means of comparison a correction signal is derived from the undelayed picture signal and the picture signal delayed once and twice. This correction signal is applied to a second correction circuit which is provided with a delaying element having a time delay of approximately one field period, the second correction signal provided by the second correction circuit and a picture signal delayed by one line period being applied to an adder an output terminal of which forms the output terminal of the circuit arrangement.

Figure 1:
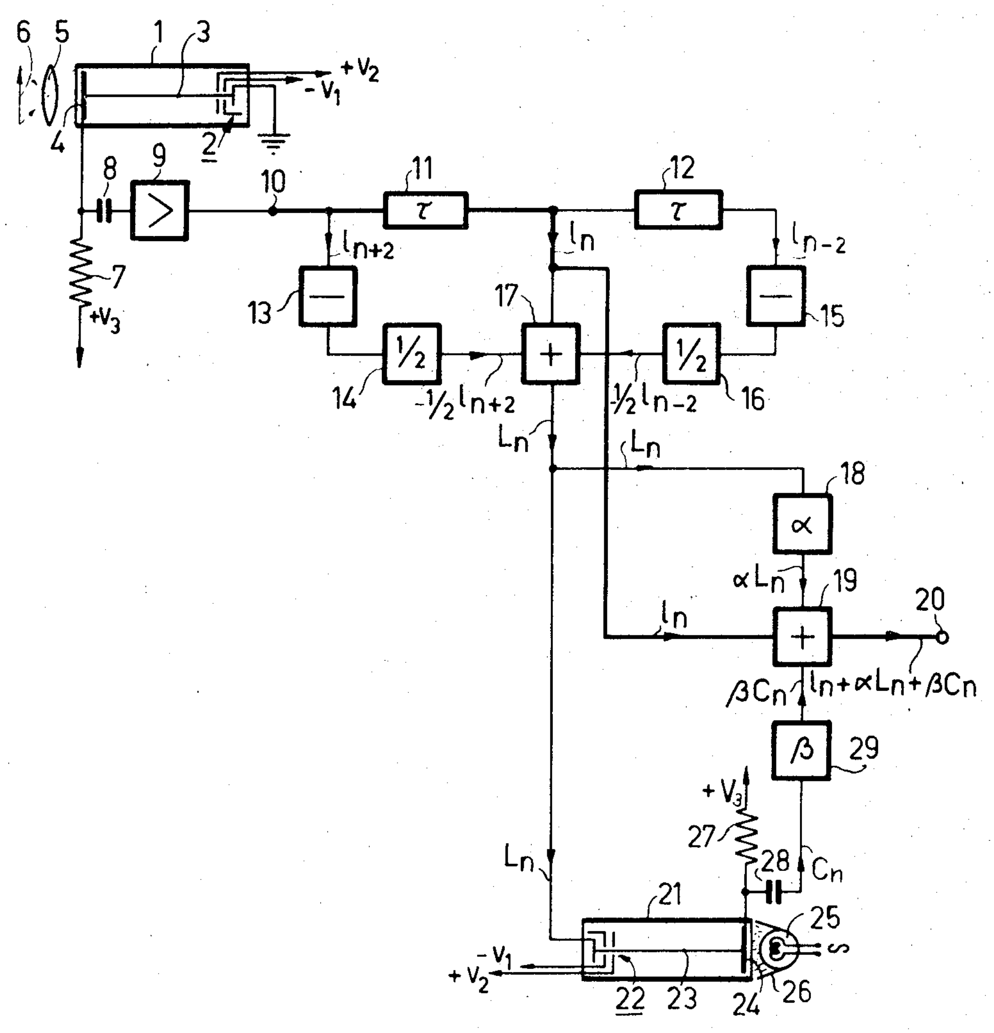

INVENTOR.
SING LIONG TAN

BY

AGENT

INVENTOR.
SING LIONG TAN
BY
[signature]
AGENT

CIRCUIT ARRANGEMENT FOR VERTICAL APERTURE CORRECTION

The invention relates to a circuit arrangement for vertical aperture correction of a picture signal which is line and field-generated by means of a television camera, which correction takes place transversely to the interlaced line deflection, the picture signal being applied to an input terminal of the circuit arrangement at an output terminal of which an aperture-corrected picture signal occurs, the input terminal being connected to a correction circuit wherein at least one delaying element gives the picture signal a first and a second time delay and wherein by means of comparison a correction signal is derived from the undelayed picture signal and the picture signal delayed once and twice.

Various circuit arrangements for vertical aperture corrections are described by A. C. Schroeder and W. G. Gibson in an article "Television Vertical Aperture Compensation" published in "Journal of the S.M.P.T.E.", Vol. 64. pages 660–670, Dec. 1955. This article states the reasons for using the aperture correction, namely the diameter of the electron beam in a pickup element formed as a television camera tube has a finite dimension and the information of a picture element in the scene to be recorded is influenced by that of adjacent picture elements. Errors in the optical system may likewise be given as a reason. The resultant loss of contrast upon display of a picture signal on a screen of a display tube is reduced by the aperture correction. The aperture correction into the direction of the line deflection is generally referred to as horizontal aperture correction. The so-called vertical aperture correction takes place transversely thereto. Both corrections are performed by comparing the information of adjacent picture elements with each other and by deriving a correction signal therefrom which is added to the picture signal supplied by the camera tube. An aperture-corrected picture signal is the result.

The said article describes particularly on pages 666 and 667 how the vertical aperture correction can be performed with the aid of one or more delaying elements. For obtaining the information of an upper and a lower picture element the circuit arrangement may be provided, for example, with a series arrangement of two delay lines each of which delay the picture signal by one line period. The result in case of interlaced line deflection is that the nearest picture elements do not supply the desired information, but the picture elements of the lines $n-2$ and $n+2$ are used for a line $n$. In this way a rough correction is obtained.

The article also describes that when using the delay times of a field period plus and minus half a line period, the nearest picture elements are utilized for the correction so that a finer correction is the result. A drawback is, however, that when displaying a scene on a screen of a display tube in which scene a moving, for example a bright component occurs, a dark or black smear may appear behind this component. In fact, during the relatively long time delay of approximately one field period the moving component may be displaced so far that the information of the previously adjacent picture elements are altogether unsuitable for the correction. All this will further be explained in the course of this description.

An object of the present invention is to provide a circuit arrangement for vertical aperture correction by means of which a fine aperture correction can be obtained without the said drawback occurring. To this end the circuit arrangement according to the invention is characterized in that the said correction circuit is connected to apply the said correction signal to a second correction circuit which is provided with a delaying element having a time delay of approximately one field period, while the time delay of the delaying element in the first correction circuit is one line period, the second correction signal provided by the second correction circuit and a picture signal delayed by one line period being applied to an adder an output terminal of which forms the output terminal of the circuit arrangement.

Figure 2:
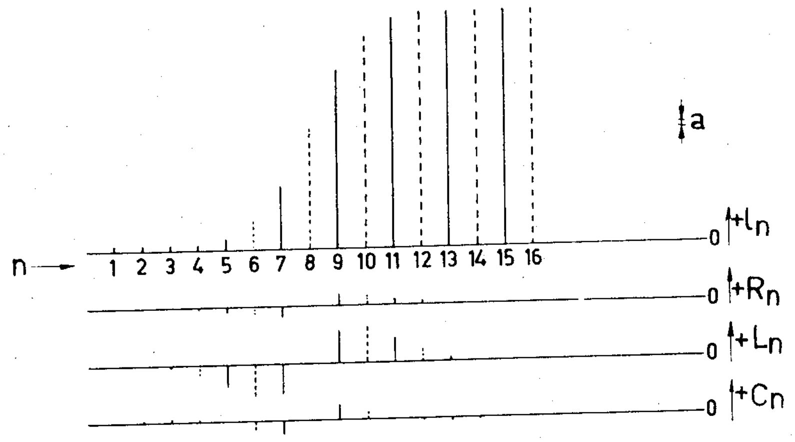
Figure 3:
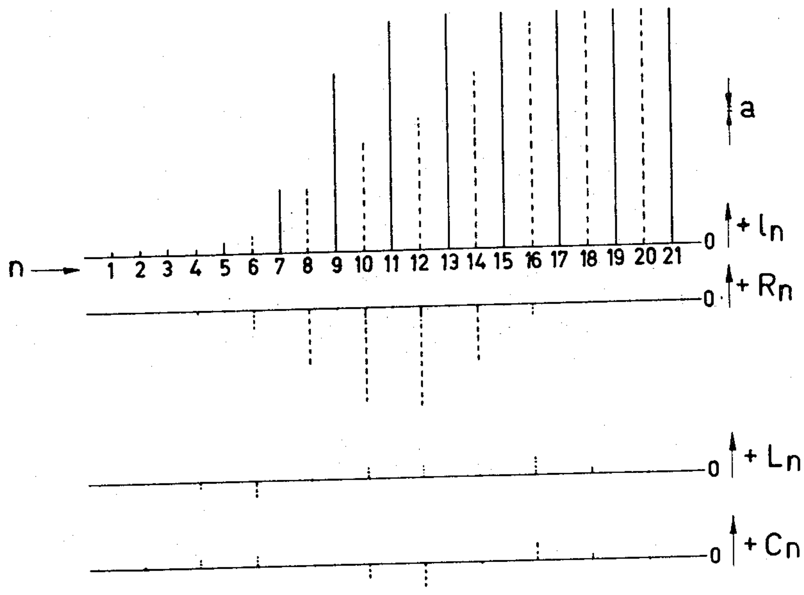

In order that the invention may be readily carried into effect, an embodiment thereof will now be described in detail by way of example with reference to the accompanying diagrammatic drawings, in which:

FIG. 1 shows an embodiment of a circuit arrangement for vertical aperture correction according to the invention, FIG. 2 serves for illustration of the operation of the circuit arrangement of FIG. 1, when a picture signal represents a scene without moving components, and FIG. 3 serves for the same purpose as FIG. 2, and is associated with a scene wherein a component moves in a vertical direction.

In FIG. 1 the reference numeral 1 denotes a television camera tube of, for example, the vidicon type. The television camera pickup element formed as the camera tube 1 may form part of a monochrome or color television camera. Only a few components essential for the operation of camera tube 1 are shown in this tube. An electron gun 2 in the camera tube 1 is built up from a cathode connected to ground, a wehnelt cylinder connected to a terminal having a potential $-V_1$ and an anode connected to a terminal having a potential $+V_2$. The electron gun 2 provides an electron beam 3 which under the influence of deflection and focusing means not shown scans a photosemiconductive layer line by line and field by field which layer is provided on a transparent metal signal plate 4. An optical picture of a scene 6 to be recorded is made through an optical system of lenses 5 on the photosemiconductive layer. Since the signal plate 4 is connected through a resistor 7 to a terminal of potential $+V_3$, a potential image corresponding to the optical picture is produced on the side of the semiconductor layer scanned by the electron beam 3. A picture element of the potential image is obtained by integration of the local light intensity between two successive electron beam scans of the relevant picture element, that is to say an optical picture is converted over two field periods into a potential image by means of integration. The line and field-scanning of the semiconductive layer on the signal plate 4 by means of the electron beam 3 results in the potential image and hence the optical picture being converted into a voltage variation across resistor 7. The junction of the signal plate 4 and the resistor 7 is connected through a capacitor 8 to an amplifier 9. Thus, a picture signal representing the scene 6 and generated by the television camera tube 1 is applied to amplifier 9. Amplifier 9 may be designed in an arbitrary manner and is therefore left outside consideration.

Amplifier 9 applies the picture signal to an input terminal 10 of the circuit arrangement for vertical aperture correction. A series arrangement of two delaying elements 11 and 12 each of which gives the picture signal a time delay $\tau$ is connected to the input terminal 10. The delay $\tau$ of the elements 11 and 12 formed, for example, as delay lines corresponds to one line period. For an interlaced line deflection the result is that when the picture signal of the $(n+2)^{nd}$ line is applied to the input terminal 10, the junction in or the end of the series arrangement employing the elements 11 and 12 conveys the picture signal of the $n^{th}$ or $(n-2)^{nd}$ line. The relevant picture signals are indicated by $l_{m+2}$, $l_n$ and $l_{n-2}$ respectively. The picture signals $l_{n+2}$ and $l_{n-2}$ are applied through phase inverters 13 and 15 and a divide-by-two circuits 14, and 16, respectively, to an adder 17 to which also the picture signal $l_n$ is applied. The result is that the adder 17 provides a signal $L_n=l_n-½(l_{n-2}+l_{n+2})$. The signal $L_n$ is provided as a correction signal by a correction circuit which comprises the components (11–17). The correction signal $L_n$ is generally applied optionally through an amplifier 18 having a factor $\alpha$ to an adder 19 to which also the picture signal $l_n$ delayed by one line period is applied. The adder 19 is then connected to an output terminal 20 of the circuit arrangement for vertical aperture correction, an aperture-corrected picture signal $l_n+\alpha\ L_n$ occurring at the output terminal 20.

Without taking further steps the result is that the aperture correction in case of interlaced line deflection in the camera tube 1 takes place by comparing picture elements which are not located side by side. A picture element of the $n^{th}$ line is compared with a picture element of the $(n-2)^{nd}$ and of the $(n+2)^{D}$ LINE) A rough correction is the result.

For obtaining a finer correction the correction signal $L_n$ provided by the correction circuit (11–17) is applied according to a step of the invention to a second correction circuit which includes a delaying element formed as a memory tube 21. The connection between the adders 17 and 19 is irrelevant for the principle of the invention and may be considered to be absent. An advantage of the said connection will be apparent in the course of this description.

A camera tube of the vidicon type may be used for the memory tube 21. An electron gun 22 in the memory tube 21 is built up from a cathode, a wehnelt cylinder connected to a terminal of potential $-V_1$ and an anode connected to a terminal of potential $+V_2$. The correction signal L is applied to the cathode of the electron gun 22 so that the instantaneous value of the cathode potential in the memory tube 21 is determined by that of the correction signal $L_n$. Under the influence of deflection and focusing means not shown an electron beam 23 scans line by line and field by field a photosemiconductive layer which is provided on a transparent metal signal plate 24. Signal plate 24 is irradiated by a lamp 25, an equal constant local light intensity across the signal plate 24 being obtained with the aid of a fitting 26. The signal plate 24 is connected through a resistor 27 to a terminal of potential $+V_3$.

In the memory tube 21 the correction signal $L_n$ is written by means of cathode modulation in a continuous manner ever the potential image provided on the photosemiconductive layer of the signal plate 24 of the previous, similar that is to say, odd or even field. As a result a more or less constant voltage drop is produced across the resistor 27 which is determined by the more or less constant leakage in the photosemiconductive layer on the signal plate 24 caused by the influence of the lamp 25. A varying voltage may also occur across resistor 27. This varying voltage corresponds to the difference which occurs for a given picture element between the values of the correction signal $L_n$ of two successive similar fields. The result is that the memory tube 21 provides a correction signal obtained by the comparison performed and denoted by $C_n$ through a capacitor 28 which is connected to the junction of the signal plate 24 and the resistor 27. The correction signal $C_n$ is applied through an amplifier 29 having an amplification factor $\beta$ to the previously mentioned adder 19. In case of an interrupted connection between the adders 17 and 19 the result is that an aperture-corrected picture signal $l_n+\beta\, C_n$ occurs at the output terminal 20.

The second correction circuit employing the components (21–28) may be formed in a similar manner as the first correction circuit (11–17). To this end a first delaying element having a time delay which is equal to one field period minus half a line period can be connected in series with a second delaying element having a time delay which is equal to one line period. If a given information of the $n^{th}$ line is applied to the first delaying element, the second delaying element receives the information of the nearest corresponding part of the lower $(n+1)^{st}$ line of a previous field, while it supplies the information of the upper $(n-1)^{st}$ line. After a phase inversion and a division by two of the information of the $(n+1)^{st}$ line and the $(n-1)^{st}$ line the desired correction signal is obtained by adding to the information of the $n^{th}$ line. Starting from the first correction signal $L_n$ the second correction signal $C_n$ can thus be obtained.

It is found that the construction of the first (11–17) and the second correction circuit (21–28) can be effected in many manners. As regards the delaying elements 11 and 12 there applies that these may each comprise a modulator and a demodulator for an embodiment employing a simple glass delay line having a higher frequency range than the picture signal. If reflection phenomena in a delay line are used, it is sufficient to have one delaying element. It is alternatively possible to use one delaying element if an undelayed picture signal and a picture signal which is delayed once are simultaneously applied to the element with the aid of quadrature modulation.

The effect obtained by the invention may be explained in a simple manner with reference to FIG. 2 and FIG. 3. The usefulness of the connection between the adders 17 and 19 provided through the amplifier 18 will also be apparent.

In FIGS. 2 and 3 one instantaneous value of each line period of the picture signal $l_n$ is plotted relative to a level indicated by the reference O along which level the line numbers have been drawn with $n=1, 2, 3$ etc. The instantaneous values of the picture signal $l_n$ plotted in a pulsatory manner are associated with the information from picture elements located in a vertical column on the photosemiconductive layer of the signal plate 4 in the camera tube 1 of FIG. 1. To emphasize the interlaced condition of the line deflection the instantaneous values of the picture signal $l_n$ are plotted by a solid line for the odd line numbers and by a broken line for the even line numbers. A small value is plotted for the low-line numbers which value is associated, for example, with a black or grey picture element. For the high-line numbers a high value is plotted which is associated, for example, with a white picture element. It is apparent from the drawn values that the starting point for illustration of the operation of the circuit arrangement of FIG. 1 is a scene 6 which shows a black or grey part which when viewed in the downward direction merges into a white part. In connection with the diameter of the electron beam 3 in the camera tube 1 and the mutual influence of adjacent picture elements on the photosemiconductive layer of the signal plate 4, for example, a sharp transition in the scene 6 will become apparent in the picture signal $l_n$ as a more or less uniformly varying transition built up in a pulsatory manner. The lines drawn on either side of the transition indicate the transition which may occur somewhere in the scene 6.

FIG. 2 relates to a scene 6 wherein no displacement of the said transition takes place during two considered successive fields. FIG. 3 relates to a scene wherein the transition in the even field is not in the same place as in the previous odd field, since the transition has moved within one field period.

In FIGS. 2 and 3 signals $R_n$, $L_n$ and $C_n$ are plotted at an equal scale relative to the zero level in a corresponding manner as the picture signal $l_n$. The signal $R_n$ is the correction signal which is associated with a correction at which a delay over approximately one field period is used. For deriving the correction signal $R_n$ picture elements of successive lines and located closely together are thus compared with the other. The result in a formula is:

$$R_n = l_n - \tfrac{1}{2}(l_{n-1} + l_{n+l}).$$

The signal $L_n$ is the correction signal shown in FIG. 1, which, written in a formula, leads to:

$$L_n = l_n - \tfrac{1}{2}(l_{n-2} + l_{n+2}).$$

The signal $C_n$ is obtained by performing a second correction with a field period delay on the correction signal $L_n$ so that in a formula:

$$C_n = L_n - \tfrac{1}{2}(L_{n-1} + L_{n+1})$$

Completion of the formula in a certain grouping yields:

$$C_n = l_n - \tfrac{1}{2}(l_{n-1} + l_{n+1}) - \tfrac{1}{2}[\ \{ l_{n-2} - \tfrac{1}{2}(l_{n-3} + l_{n-1})$$
$$+ l_{n+2} - \tfrac{1}{2}(l_{n+1} + l_{n+3}\ \}\ ]$$
$$\text{or } C_n = R_n - \tfrac{1}{2}(R_{n-2} + R_{n+2})$$

Starting from an instantaneous value $a$ of the picture signal $l_n$ for a black or grey picture element and from a value $41a$ for a white picture element, the correction signals are calculated with the aid of the given formulas and are shown in the table below and plotted in FIGS. 2 and 3.

TABLE

| | Fig. 2 | | | | | | | | Fig. 3 | | | | |
|---|---|---|---|---|---|---|---|---|---|---|---|---|---|
| | $l_n$ | | $R_n$ | | $L_n$ | | $C_n$ | | $l_n$ | | $R_n$ | $L_n$ | $C_n$ |
| Line $n$ | x | y | x | y | x | y | x | y | x | y | y | y | y |
| 1 | a | | 0 | | 0 | | 0 | | a | | | | |
| 2 | | a | | 0 | | 0 | | +¼a | | a | 0 | 0 | +¼a |
| 3 | a | | 0 | | −½a | | +½a | | a | | | | |
| 4 | | a | | −½a | | −2a | | +¼a | | a | −½a | −a | +1¼a |
| 5 | 2a | | −a | | −4a | | 0 | | 2a | | | | |
| 6 | | 5a | | −1½a | | −6a | | −1¼a | | 3a | −3½a | −3a | +1¾a |
| 7 | 11a | | −2a | | −5½a | | −2½a | | 11a | | | | |
| 8 | | 21a | | 0 | | 0 | | 0 | | 11a | −10a | 0 | 0 |
| 9 | 31a | | +2a | | +5½a | | +2½a | | 31a | | | | |
| 10 | | 37a | | +1½a | | +6a | | +1¼a | | 19a | −16½a | +2a | −2¾a |
| 11 | 40a | | +a | | +4a | | 0 | | 40a | | | | |
| 12 | | 41a | | +½a | | +2a | | −¼a | | 23a | −17½a | +2a | −4¼a |
| 13 | 41a | | 0 | | +½a | | −½a | | 41a | | | | |
| 14 | | 41a | | 0 | | 0 | | −¼a | | 31a | −10a | 0 | −¼a |
| 15 | 41a | | 0 | | 0 | | 0 | | 41a | | | | |
| 16 | | 41a | | 0 | | 0 | | 0 | | 39a | −2a | +3a | +3a |
| 17 | | | | | | | | | 41a | | | | |
| 18 | | | | | | | | | | 41a | 0 | +a | +a |
| 19 | | | | | | | | | 41a | | | | |
| 20 | | | | | | | | | | 41a | 0 | 0 | 0 |

In the table (FIG. 2 and FIG. 3) "x" indicates the odd field and "y" indicates the even field.

It is apparent from the table and FIG. 2 that the desired fine correction which is achieved with a correction signal $R_n$ is closely approximated by the correction signal $C_n$. The correction signal $L_n$ gives a rough correction. All this applies to a transition for which black or grey to white has been assumed as an Example, which transition does not undergo any displacement during two successive fields.

The stationary condition which is described with reference to FIG. 2 is the starting point for the description of FIG. 3. For the sake of simplicity of explaining FIG. 3 it is assumed that the line with $n$=1 is the first line of an odd field, and the line with =2 is the first line of an even field. At the beginning of the odd field the first line $n$=1 of the odd field is scanned two field periods earlier by the electron beam 3 on the signal plate 4 in the camera tube 1. During these two field periods giving an integration period the first line $n$=1 of the potential image on the photosemiconductive layer of the signal plate 4 has had the opportunity to be formed. The first line $n$=2 of the even field has had an integration period of one field period until the beginning of the considered odd field. Since at the beginning of the considered odd field the situation assumed for FIG. 3 is equal to that of FIG. 2, the instantaneous values of the picture signal $l_n$ for the odd field in FIG. 3 will be equal to those in FIG. 2, as is shown by solid lines.

It is assumed that the transition in the scene 6 is displaced stepwise during scanning of, for example, the 19th line on the signal plate 4. This displacement of the transition in the scene 6 corresponds, for example, to a displacement of the transition in the optical picture on the signal plate 4, from the lines 5, 6,....10, 11 to the lines 11, 12,......16, 17. For the lines having low-even numbers there applies that these had the transition on the lines 6, 8 and 10 in the previous even field over an integration period of approximately one field period, which transition is subsequently present on the lines 12, 14 and 16 during an integration period of approximately the field period of the odd field. It is assumed that the integration period during scanning of the lines $n$=1 to $n$=19, that is to say, over nine line periods, is negligibly small relative to one field period. The result of all this is that when scanning the line $n$=6 an instantaneous value of the picture signal $l_n$ is obtained in the considered even field succeeding the odd field in FIG. 3, which value is composed of $5a/2$ (integration in first, even field period) and $a/2$ (integration in second, odd field period) which results in $3a$. For, for example, the line $n$=12 these values are $41a/2+5a/2=23a$. Further values are shown in the table under $l_n$, even field $y$. Since FIG. 3 serves for illustration of the influence of the correction signals $R_n$, $L_n$ and $C_n$ during the even field, only the values for the even field are shown.

It is apparent from the table and FIG. 3 that the correction signal $R_n$ reaches very high negative values. When displaying the signal $l_n+R_n$ on a screen of a display tube it is found that a deep black smear occurs behind the displaced transition merging from black or grey to white. A bright smear occurs behind a moving converted transition. The correction signal $L_n$ now provides, however, an altogether acceptable correction. The same applies to the correction signal $C_n$.

A comparison between the values in the table and FIG. 2 and FIG. 3 gives as a result that a fine aperture correction (such as with $R_n$) is possible with the aid of the correction signal $C_n$ for a scene 6 without moving components while a rougher correction (such as with $L_n$) occurs in case of moving components. This rougher correction in case of moving components satisfies the requirements since the correction as compared with that of stationary components becomes less manifest.

It is found that the use of a correction signal $R_n$ is generally inadmissible. On the other hand a combination of the correction signals $C_n$ and $L_n$ is quite possible. FIG. 1 shows that the aperture-corrected picture signal occurring at the output terminal 20 may be represented, for example, by $l_n+\alpha L_n+\beta C_n$. The values of the amplification factors $\alpha$ and $\beta$ may be adjusted to the desired extent of aperture correction by using adjustable amplifiers 18 and 29 and in accordance with the user's subjective choice.

What is claimed is:

1. A vertical aperture correction circuit for an interlaced scanned video signal comprising first means for aperture correction including at least a first delay means for receiving said video signal and for providing said video signal delayed by one and two line periods, comparison means coupled to receive said undelayed, one line delayed, and two line delayed video signal for providing a first aperture correction signal; second means for aperture correction including a second delay means having a time delay of substantially one field period, an input coupled to receive said first aperture correction signal, and an output for supplying a second aperture correction signal; and an adder having a first input coupled to receive said one line delayed signal, a second input coupled to said second delay means output for receiving said second aperture correction signal, and an output means for supplying the resultant corrected signal.

2. A circuit as claimed in claim 1 wherein said adder further comprises a third input and further comprising first and second adjustable gain amplifiers, said first amplifier being coupled between said third input and said comparison means, said second amplifier being coupled between said adder second input and said second correction means output.

3. A circuit as claimed in claim 1 wherein said second delay means comprises a video camera tube having a cathode coupled to said comparison means, and a target plate coupled to said adder second input; and means for uniformly illuminating said target plate.

4. A circuit as claimed in claim 1 wherein said first aperture correction means comprises a first delay line coupled to receive said video signal, a second delay line coupled to said first delay line, a pair of phase inverters coupled to said delay lines respectively, and a comparison means adder coupled to said attenuators and the junction of said delay lines.

* * * * *

PO-1050
(5/69)

UNITED STATES PATENT OFFICE
CERTIFICATE OF CORRECTION

Patent No. 3,629,498 Dated December 21, 1971

Inventor(s) SING LIONG TAN

It is certified that error appears in the above-identified patent and that said Letters Patent are hereby corrected as shown below:

ON THE TITLE PAGE cancel "Philips Corporation" and insert -- U.S. Philips Corporation --;

Signed and sealed this 1st day of October 1974.

(SEAL)
Attest:

McCOY M. GIBSON JR.
Attesting Officer

C. MARSHALL DANN
Commissioner of Patents